United States Patent
Bagg et al.

[11] 3,947,535
[45] Mar. 30, 1976

[54] ALIGNING FIBRES

[75] Inventors: Greville Euan Gordon Bagg, Waltham Abbey; Henry Edwards, Harlow; Michael Ernest Newcombe Evans, Waltham Abbey; John Arnold Lewis, Hoddesdon; Hans Ziebland, Hertford, all of England

[73] Assignee: National Research Development Corporation, London, England

[22] Filed: Apr. 12, 1974

[21] Appl. No.: 460,577

[52] U.S. Cl. .................. 264/87; 162/102; 162/153; 264/91; 264/108; 264/128; 264/137
[51] Int. Cl.² ...................... B29D 3/02; D21H 5/18
[58] Field of Search ............ 264/87, 108, 137, 128, 264/24, 91; 162/102, 152, 153, 385, 383, 212

[56] References Cited
UNITED STATES PATENTS

| | | |
|---|---|---|
| 1,289,152 | 9/1972 | UK |
| 2,159,638 | 5/1939 | Schur.................................. 162/383 |
| 3,043,742 | 7/1962 | Chaplin.............................. 162/212 |
| 3,454,691 | 7/1969 | Davis.................................. 264/108 |
| 3,617,437 | 11/1971 | Bagg et al............................ 264/87 |
| 3,719,553 | 3/1973 | Dorril.................................. 264/87 |

FOREIGN PATENTS OR APPLICATIONS

| | | |
|---|---|---|
| 1,290,904 | 9/1972 | United Kingdom.................... 264/91 |
| 1,289,152 | 9/1972 | United Kingdom.................... 264/91 |
| 1,179,686 | 1/1970 | United Kingdom.................... 264/91 |

*Primary Examiner*—Jeffery R. Thurlow
*Attorney, Agent, or Firm*—Cushman, Darby & Cushman

[57] ABSTRACT

Aligned fibre mats are produced by passing a continuously accelerating or decelerating stream of fibre dispersion over a permeable surface and simultaneously withdrawing a limited proportion of the dispersion liquid through the permeable surface to deposit aligned fibres thereon. Mats having a wide variety of shapes and alignment patterns may readily be produced and may subsequently be impregnated with resins, metals etc. to form fibre-reinforced composite materials.

12 Claims, 7 Drawing Figures

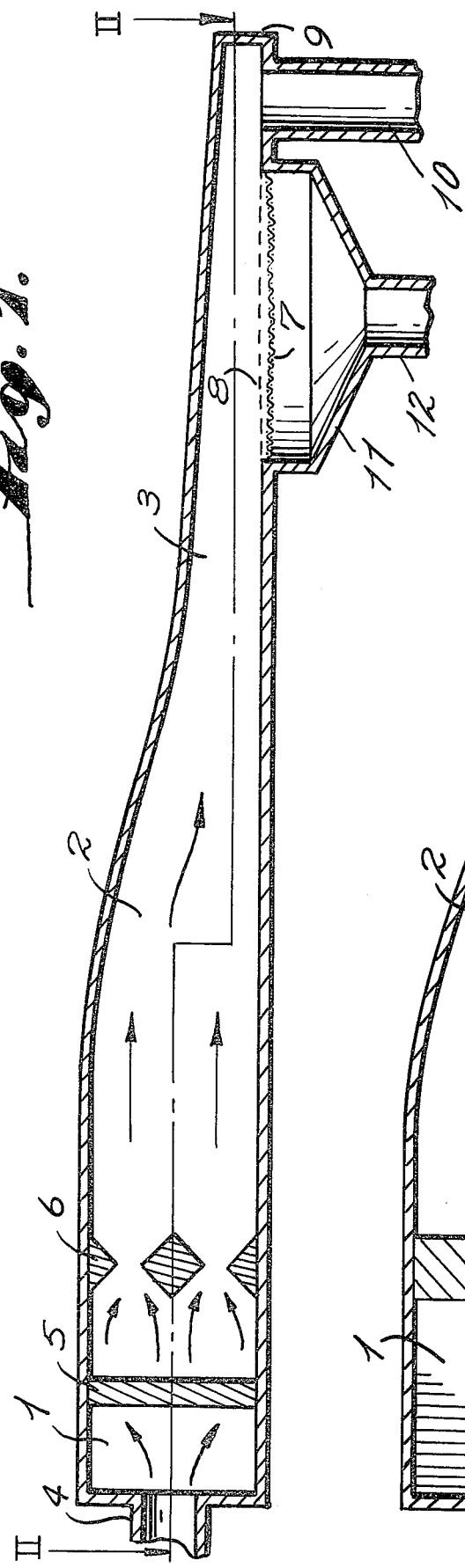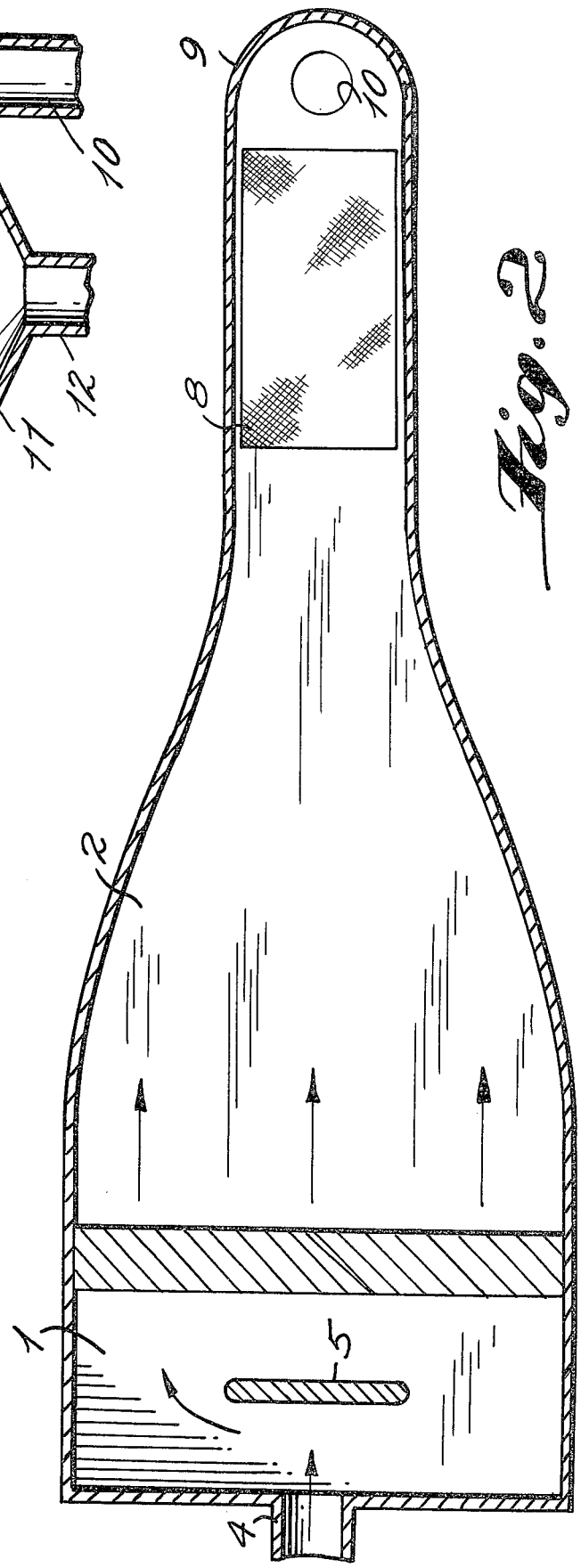

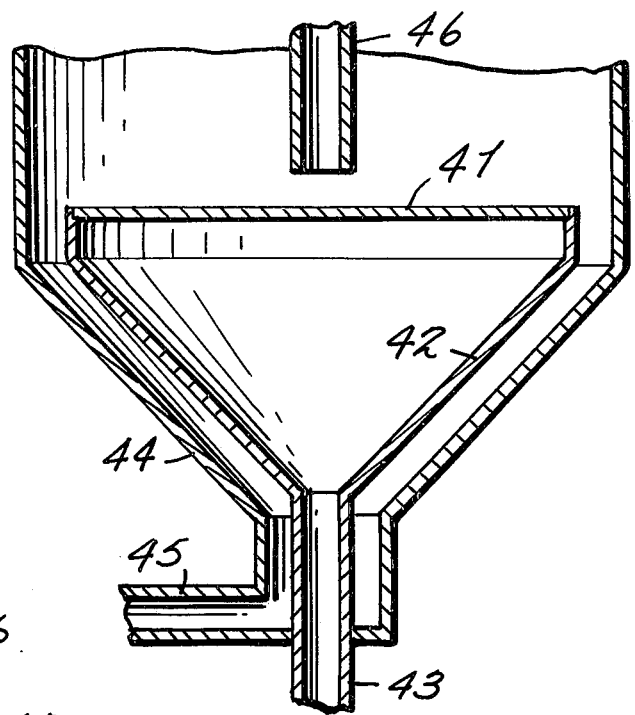
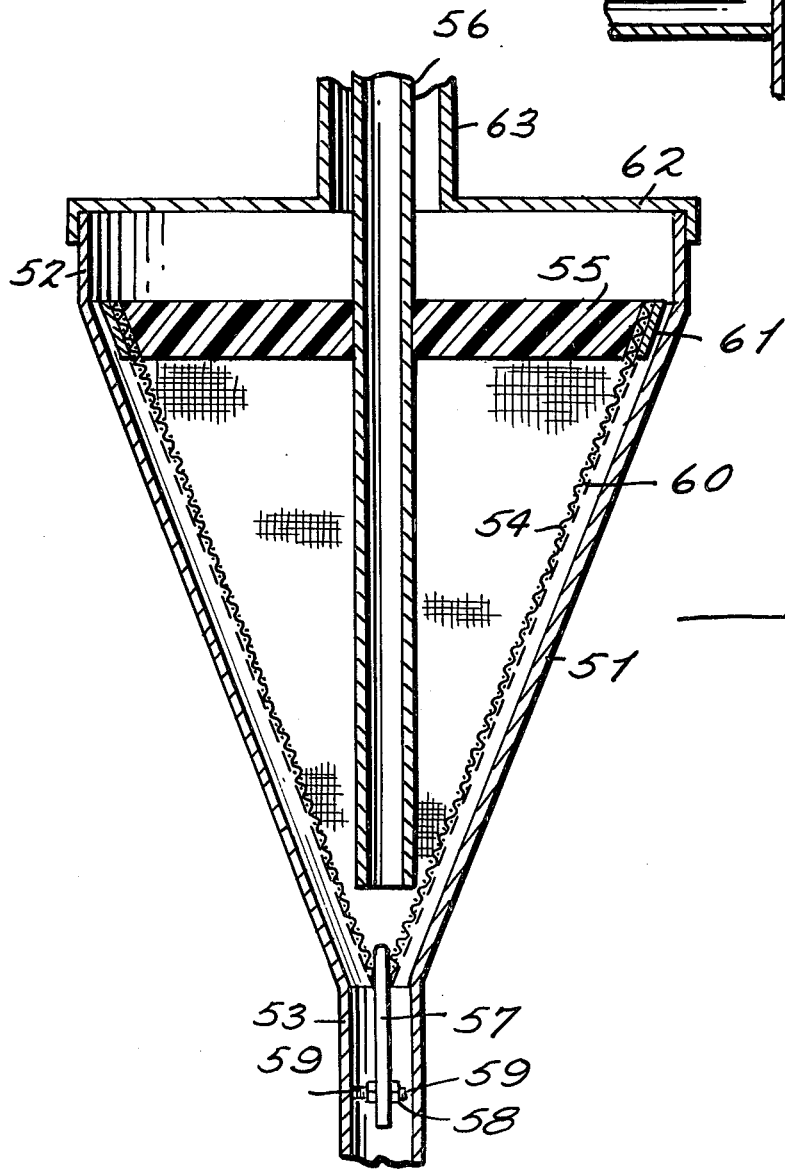

ALIGNING FIBRES

The invention relates to processes for the manufacture of composite materials composed of a matrix containing fibres dispersed therein and is particularly concerned with processes for producing mats of aligned fibres suitable for impregnating with a matrix material to form such composites. The term "fibre" as used herein includes natural fibrous material such as asbestos, synthetic short fibres such as glass fibres, chopped carbon fibres and chopped polymeric fibres (eg, PTFE) and also inorganic whiskers (that is elongated single crystal fibres having a length to diameter ratio of at least 10 and generally 100 or more), for example silicon carbide or silicon nitride whiskers.

Alignment of fibres in a composite is often desired in order to achieve the maximum strength and fibre content in the finished composite. The pattern of fibre alignment in the mats from which the composite is formed determines the strength characteristics of the resulting composite, the composite generally being stronger along a line parallel to the major axis of the fibres than along a line at right angles thereto. The fibres tend to be brittle, and hence require careful handling if the maximum strength is to be achieved in the composite.

Numerous processes for forming mats of aligned fibres have been proposed, for example extruding fibres dispersed in an alginate matrix, chemically setting the matrix and then burning off the matrix to leave aligned fibres (U.K. Specification No. 1,128,321) or passing a dispersion of fibres through an aligning nozzle onto a permeable surface and rapidly removing the liquid carrier (U.K. Specification No. 1,249,291). Such processes may be employed to produce mats in the form of rods, tubes, sheets etc having unidirectional alignment or circular mats having circumferential alignment. However, for certain applications it is desirable to use mats having alignment patterns which may not be produced by the above processes either directly or by combinations of unidirectional sheets. Examples of such mats include circular mats having radial alignment and mats in the form of hollow cones having the fibres aligned along generator lines.

It has now been found that the mats of fibres having predictable alignment patterns may be prepared by passing a dispersion of fibres in a liquid medium over a permeable surface under the simultaneous influence of two forces, a filtration force having its major component perpendicular to the permeable surface to remove the liquid medium and leave a mat of fibres on the permeable surface, and an aligning force acting on the fibres to effect the desired alignment. This alignment force may be generated by any means known in the art including field dynamic drag forces caused by the acceleration of the suspension passing through a diverging section or gravity induced acceleration of the suspension in a vertical or near vertical falling film.

According to the present invention a process for the production of a mat of aligned fibre suitable for impregnating with a matrix to form a composite material comprises passing a continuously accelerating stream of a dispersion of fibres in a liquid medium from a dispersion supply source over a permeable surface thereby subjecting the fibres to a continuous aligning force, and simultaneously applying a pressure difference across the permeable surface to cause a part of the liquid medium through the permeable surface and leave a mat of aligned fibres on the surface. The terms "accelerating" and "acceleration" as used in the specification and claims are used in their broad scientific sense to include both positive acceleration and negative acceleration sometimes termed deceleration.

By causing the aligning force to act simultaneously with the filtration force due to the pressure difference, the orientation of the fibres is preserved as they flow over the permeable surface and are gradually deposited thereon. Thus there exists at all times a layer of the liquid medium above the permeable surface to give a "flooded bed" system in contrast to processes, such as that described in U.K. Pat. Specification No. 1,249,291, wherein the alignment of the fibres can be maintained only by rapid removal of the liquid medium as soon as the dispersion contacts the permeably surface. By the process of the present invention, fibres may be deposited simultaneously over the whole of the permeable surface, avoiding the need for reciprocating nozzles as used on the aforementioned prior art.

In order to achieve the maximum degree of alignment it is preferable that the rate at which liquid medium is withdrawn through the surface at any point should be maintained well below the rate of flow of dispersion across the surface at that point so that the resultant mean direction of flow is still substantially parallel to the surface to prevent fibres being embedded end-on or even passing through the permeable surface. The excess dispersion passing over the permeable surface may, of course, be re-cycled and added to the feed of fresh dispersion passing over the permeable surface. The rate of removal of liquid medium will also be limited, in the case of accelerating flow, by the need to maintain acceleration of the reduced volume of dispersion across the surface and such removal must be allowed for in the design of apparatus for achieving such acceleration. However, increasing the percentage of the feed dispersion which is recycled increases pumping costs and the degradation of the fibres caused by repeated passage through the pump. The rate of liquid medium through the permeable surface should normally be between 5 and 30% preferably 10 to 15% of the feed rate of the dispersion.

An especially convenient means of achieving continuous acceleration of the dispersion across the permeable surface comprises passing the dispersion between the permeable surface and one or more non-permeable surfaces arranged so that the cross-sectional, or more precisely flow, area of the dispersion front decreased progressively in the direction of flow. For example the dispersion may be passed along the annular space between co-axial cones or radially from the outside to the centre of two circular plates, in each case one surface being permeable. Alternatively the dispersion may be allowed to flow as a thin film down a vertical permeable surface, the acceleration being caused by gravity. In each of these cases, the flowrate of liquid medium through the permeable surface must not be so great as to cause a decelerating of the dispersion in a direction parallel to the permeable surface.

The pressure difference across the permeable surface may be generated by increasing the pressure applied to the dispersion on the surface to greater than ambient pressure and/or decreasing the pressure on the opposite side of the surface to less than ambient. Increasing the pressure to greater than ambient may be achieved by any known means such as pumping, for example with a peristaltic or Mono (Trade Mark) pump, by feeding from a pressurized reservoir or by the hydrostatic pressure of a column of suspension above the permeable surface.

The fibres will normally be reinforcing fibres intended to modify the mechanical properties of the final composite material, but may alternatively or additionally be intended to modify other properties of the composite, for example the electrical or wear properties. Suitable reinforcing fibres for use in the present invention include chopped carbon fibres, chopped nylon fibres, asbestos fibres, glass fibres, silicon nitride whiskers and silicon carbide whiskers.

Better alignment of a greater weight of fibres is obtained with increase in the viscosity of the liquid medium. However, the liquid medium should preferably be water soluble to assist its removal from the finished mat. Suitable liquid media include glycerol, aqueous solution of glycerol and aqueous solutions of cellulose ethers.

Matrices with which the aligned fibre mats produced by the process of the invention may be impregnated include resins especially thermosetting resins such as phenol-formaldehyde, epoxy, polyester or silicone resins and metals such as aluminum and its alloys.

The permeable surface may be a rigid filter surface such as a sintered glass or metal plate, porous polyethylene sheet, metal gauze, or a flexible porous gauze, such as nylon gauze, supported by a rigid wire mesh. The permeable surface is preferably a gauze whose mesh size is just smaller than the length of the majority of the fibres so that it presents low impedance to the flow of liquid through it. The process of the present invention permits mats of various shapes and conformations to be produced and the permeable surface should preferably conform to the desired shape of the finished composite. It is, however, possible to form composites from mats which have been formed into the desired shape and, indeed, this may be necessary when a laminated structure having layers of fibres aligned in different directions is desired in the composite.

The process of the present invention provides convenient routes to the production of certain configurations of aligned fibre mats not readily obtainable by previously known methods. For example, circular mats having fibres aligned in radial directions have previously been prepared using a narrow nozzle reciprocating radially above a rotating circular permeable surface. The present invention permits such mats to be produced much more rapidly whilst using a greatly simplified apparatus having no moving parts. Similarly conical mats may be formed directly by the process of the present invention.

The mats of aligned fibres produced by processes in accordance with the present invention may be washed free of liquid medium, and then impregnated with the desired matrix to form a composite by conventional processes. For example a thermo-setting resin, about 60% by weight of the fibre to be impregnated, dispersed in a suitable solvent is contacted with the fibre mat. The mat is then dried to remove the solvent and the resulting "prepreg" is partially cured to a point where the resin has the correct viscosity in order to give the pre-preg the required handling characteristics. The pre-preg either alone or as part of a stack is then inserted in a press having plattens conforming to the desired shape of the composite and hot pressed to complete the curing of the resin.

Typical examples of processes in accordance with the present invention and apparatus in which they may be carried out will now be described with reference to the accompanying drawings in which:

FIG. 1 shows apparatus for producing mats of parallel aligned fibres

FIG. 2 shows a section along line II—II on FIG. 1

FIG. 5 shows apparatus for producing circular mats having circumferential alignment of fibres.

FIG. 6 shows apparatus for producing conical mats having fibres aligned along generator lines and FIG. 7 shows an apparatus for forming mats of parallel aligned fibres.

Figure 3:
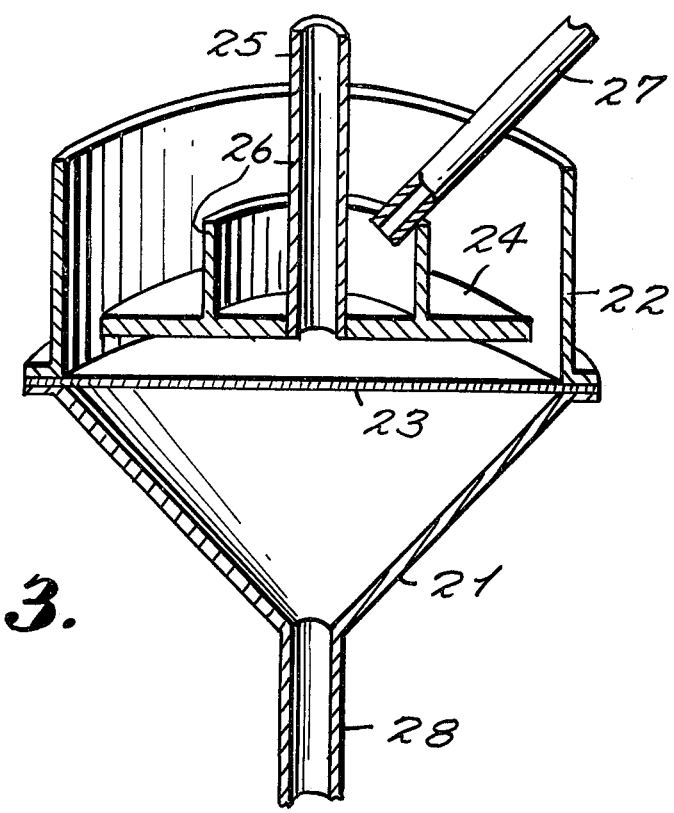
FIG. 3 shows apparatus for producing circular mats having radial alignment of fibres.

Referring to FIGS. 1 and 2, an apparatus for the production of a parallel aligned mat comprises a diffuser section 1, a converging section 2 and a deposition zone 3. A feed pipe 4 communicates with the diffuser section which is of rectangular cross-section (50mm by 450mm). A baffle 5 (width 150mm) is positioned within the diffuser section, opposite the feed pipe 4 and extending between the upper and lower, that is the longer, walls of the diffuser section. At the end of the diffuser section 1 remote from the feed pipe 4 is positioned a double horizontal slit arrangement 6. Beyond the diffuser section the side walls and upper wall of the apparatus are curved inwards to form the converging section 2 and then become planar once more to form the deposition zone 3. The lower wall is planar throughout and in the region of the deposition zone is partially formed by a permeable surface (about 160mm by 200mm) comprising a metal gauze 7 overlaid by a nylon mesh 8. The side walls of the deposition zone are mutually parallel, but the upper and lower walls converge along the permeable surface. The end wall 9 of the deposition zone is of semicircular horizontal section and the lower wall carries a return pipe 10 co-axial with the end wall. Below the permeable surface is positioned a funnel section 11 in the form of an inverted rectangular pyramid, communicating at its apex with drain tube 12.

In use, a dispersion of fibres in a liquid carrier is supplied from a reservoir (not shown) via the feed pipe 4 to the diffuser which provides substantially uniform velocity across the flow of dispersion proceeding to the converging section 2. Here the acceleration produced by the convergence causes alignment of the fibres. This alignment is preserved by the slight taper on the diposition section until the dispersion finally reaches the return pipe and is returned to the reservoir. When the flow pattern is well established, suction is applied via the drain tube 12 and funnel section 11 to the underside of the permeable surface causing part of the liquid carrier to be withdrawn through the drain tube 12 and hence aligned fibres to be deposited on the permeable surface.

Although the apparatus has been described in a horizontal configuration, it will be readily appreciated that, since the flow of dispersion is induced by pump action, the apparatus may be worked in a vertical or any other configuration.

Referring to FIG. 3, the apparatus consists of a funnel section 21 surmounted by a cylindrical section 22 of diameter 220mm. Between the two sections is fitted a permeable surface 23 comprising a sintered metal disc formed from particles of 4mm nominal diameter. An annular disc 24, of diameter 215mm is supported above the permeable surface by a return pipe 25 of diameter 12mm sealed to the centre hole in the disc and terminating at the lower surface of the disc. A vertical weir of height 40mm is mounted on the upper surface of the annular disc at a radius of 25mm from its centre. A dispersion supply pipe 27 is positioned to direct a flow of fibre dispersion from a dispersion reservoir via a pump (not shown) into the space between the weir and the return pipe. The return pipe 25 is connected to a further pump (not shown) which discharges into the said dispersion reservoir. The lower end of the funnel section 21 forms a drain tube 28 which is connected to a low pressure-difference, high displacement suction pump (not shown).

Carbon fibres of 4mm nominal length are dispered in glycerol having a viscosity of about $0.4N \ s \ m^{-2}$ (4 poise) using a low energy device to minimize damage to the fibres. The dispersion is pumped from the dispersion reservoir (not shown) along the dispersion supply pipe 27 to emerge at a rate of about $75 \times 10^{-3} m^3 \ s^{-1}$. The wier 26 evens out the flow so that dispersion overflows the wier in all directions and flows towards the edges of the disc 24. As the dispersion flows outwards across the disc its velocity progressively decreases causing the fibres to align at right angles to the flow, that is circumferentially. The dispersion flows over the edge of the disc and then towards the overflow pipe 25 from which it is withdrawn by means of a pump (not shown) and returned to the dispersion reservoir. As the dispersion flows inwards towards the overflow pipe it is subjected to continuous acceleration owing to the continuously decreasing flow area and hence the fibres rotate until they are aligned in the direction of flow, that is radially.

When the dispersion flow pattern is well established the suction pump connected to the drain tube 28 is started to apply a suction of between 30 and 60 $kN \ m^{-2}$ so that about 10% of the glycerol is drawn through the gauze and aligned carbon fibres are deposited on the gauze. As the set of deposited fibres becomes thicker the disc 24 is raised so that the gap between the mat and the disc remains constant at about 3mm.

When the mat has reached a thickness of about 2mm the supply of dispersion is terminated and the excess dispersion drawn off through the return tube 25. The disc 24 and its associated components are then removed and the suction on the mat is retained whilst the mat is washed free of glycerol by a plurality of fine water jets (not shown). The mat is then carefully lifted off the gauze and impregnated with resin solution and dried to form a pre-preg which may subsequently be hot pressed along or in a stack with similar pre-pregs to form a composite.

Figure 4:
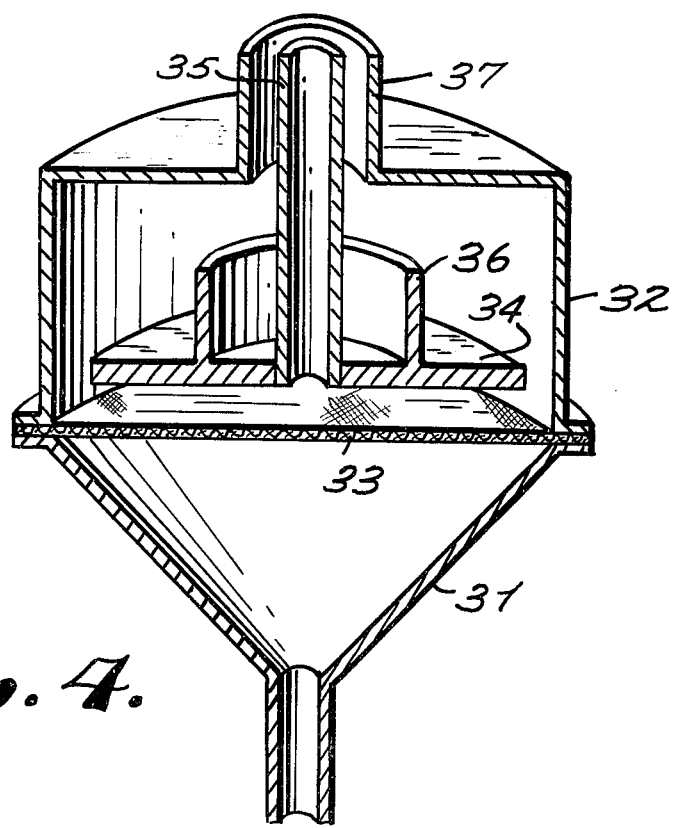
FIG. 4 shows apparatus similar to that shown in FIG. 3 but adapted for use at supra-atmospheric pressue.

FIG. 4 shows a modified form of the apparatus shown in FIG. 3 having a similar funnel section 31, gauze 33 and annuluar disc 34 bearing a return tube 35 and weir 36. However in this apparatus the upper cylindrical section 32 is closed at its upper end except for a dispersion supply tube 37 concentric with the said return tube 35, which replaces the separate supply tube 27 of FIG. 3. Thus the apparatus forms a closed system in which the portion above the gauze 33 can be entirely filled with dispersion and subjected to a supra-atmospheric pressure. In this case, the weir 36 is not essential since the flow from the inlet tube 37 will be substantially even around the circumference of the disc. However the weir is preferably maintained to improve the regularity of the flow still further.

In using the apparatus of FIG. 4 a similar procedure to that used in the apparatus of FIG. 3 is employed, except that a pressure gauge is interposed between the dispersion supply pump and the apparatus itself and the dispersion is supplied at a pressure of about 60 $kN \ m^{-2}$ (gauge) to fill the cylindrical section 32. The mat is formed more quickly than when using the apparatus of FIG. 3. When the mat has reached the desired thickness the supply of dispersion is halted and air is admitted to the dispersion supply tube 37 to enable the dispersion to be drawn off through the overflow tube 35. The disc assembly and the cylindrical section 32 are then both removed and the mat washed so above.

FIG. 5 shows apparatus similar to FIG. 3, but designed for the production of circumferentially aligned circular mats.

A sintered metal disc 41 is supported on a hollow metal cone 42 which is connected via a drain tube 43 to a suction pump (not shown). The hollow metal cone 42 is surrounded by a conical outer casing 44 which communicates at its base with a return pipe 45. A dispersion supply pipe 46 is supported above the centre of the sintered metal disc 41.

A flow of dispersion is fed from a reservoir through the supply pipe onto the disc. It then flows radially outwards across the disc until it passes over the edge of the hollow cone 42 where it is collected by the outer casing and returned via return pipe 45 to the reservoir. The deceleration of the dispersion as it flows outwards across the disc causes the fibres to align circumferentially relative to the disc. Applying suction to the underside of the permeable surfacee via the drain tube 43 causes a mat of circumferentially aligned fibres to be deposited on the disc.

FIG. 6 shows a totally enclosed apparatus for producing conical mats. The outer casing comprises a lower section 51 in the form of a hollow inverted (apexdown) cone widening at its upper end into a cylindrical section 52. The inner surface of the outer casing is shaped to form a smooth transition from the cylindrical section 22 to the conical section 51. The lower end of the conical section 21 leads into a parallel sided return pipe 53. A permeable surface comprising a conical wire gauze 54 of 100 mesh (BSS) having the same included angle as the conical section of the outer casing is fitted within and co-axial with the outer casing. A disc 55 of plastics material is mounted in the base of the gauze cone 54 and a drain tube 56 mounted axially with respect to the gauze cone passes downwards through the disc to terminate near the apex of the gauze cone.

At the apex of the gauze cone 54 is mounted a locating needle 57 which passes through a locating ring 58 supported by three lugs 59 within the return pipe 53. A nylon mesh 60 is fitted over the gauze cone 54 and both are secured to the disc 55 by a metal retaining ring 61. The top of the cylindrical section 52 of the outer casing is closed by a lid section 62 bearing a dispersion supply pipe 63 coaxial with the drain tube 56.

A dispersion of chopped carbon fibres in glycerol from a dispersion reservoir is pumped at $60 kNm^{-2}$ gauge into the apparatus through the dispersion supply pipe 63 and flows around the disc 55 and between the nylon mesh 60 on the gauze cone 54 and the conical section 51 of the outer casing. As the dispersion flows downwards the flow area available to it decreases causing a continuous increase in velocity until it flows out through the return pipe 53. When the flow is established, suction is applied through the drain tube 56 to draw some of the glycerol through the nylon mesh and wire gauze and leave a mat of fibres aligned along generator lines of the cone on the outer surface of the nylon mesh. As the thickness of the mat increases the gauze cone 54 is slowly raised to maintain a constant separation between the surface of the mat and the outer casing.

When the mat has reached the desired thickness the flow of dispersion is terminated and the lid 62 of the outer casing is removed. The gauze cone 54 is then removed from the outer casing and washed with fine jets of water whilst continuing to apply suction to the drain tube 56. The nylon mesh bearing the fibre mat is then removed from the gauze cone and the nylon is carefully peeled off the mat which is then impregnated with resin and pressed between conical dies to form a composite.

It will be appreciated that although the processes described above involve passing the dispersion between two parallel surfaces, the surfaces need not necessarily be parallel and in many cases converging surfaces may be necessary to achieve the continuous acceleration of the dispersion.

Alternatively where the dispersion path decreases very rapidly in one dimension it may be desirable to pass the dispersion between surfaces diverging in the other dimension.

Figure 7:
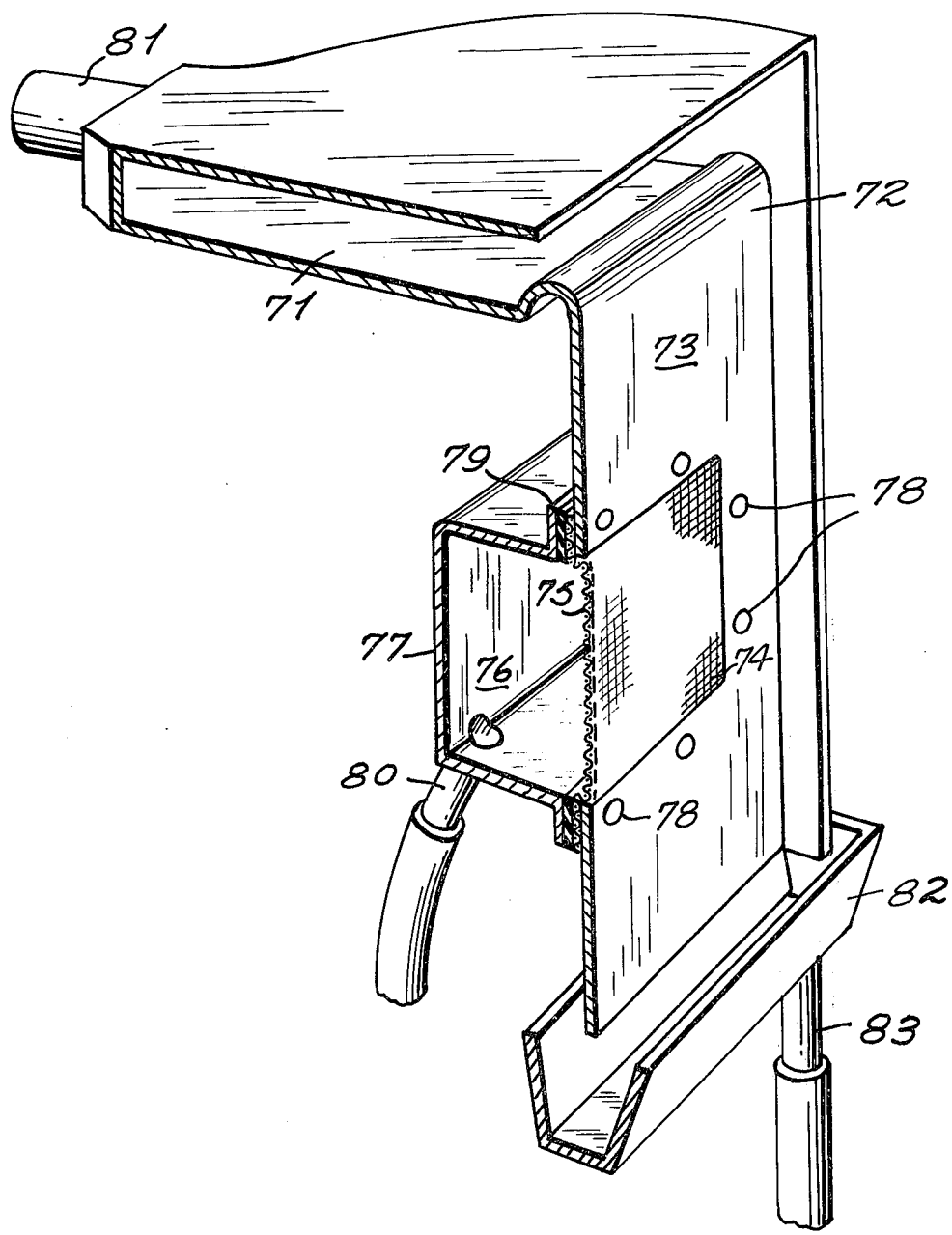

FIG. 7 shows a simple apparatus for producing mats of parallel aligned fibres by a process in accordance with the invention using gravity to produce the continuous acceleration. The apparatus comprises a horizontal diffuser section 71 terminating in a rounded weir 72 and a vertical surface 73 extending downwards from the said weir. The vertical surface has a rectangular hole cut out of it into which is inserted a permeable surface comprising a nylon mesh 74, supported by a wire gauze 75, and flush with the vertical surface. Behind the wire gauze is a suction chamber 76 formed by a dished rectangular casing 77 secured to the vertical surface by countersunk screws 78. A rubber gasket 79 is fitted between the casing and the wire gauze to ensure an airtight seal. A drain tube 80 connects the suction chamber 76 with a high displacement low-pressure difference suction pump (not shown).

A dispersion of chopped carbon fibres in glycerol is pumped from a dispersion reservoir through a dispersion supply pipe 81 to the diffuser section 71. The diffuser section evens out the flow pattern of the dispersion so that dispersion arrives at each point on the weir at approximately the same velocity. As the dispersion flows over the weir it begins to accelerate under the influence of gravity and the fibres align in the direction of flow, that is vertically. The dispersion flows down the vertical surface as a falling film maintaining the vertical alignment, and into a collecting trough 82 and thence via an overflow pipe 83 back to the dispersion reservoir.

When the flow pattern is established suction is applied by means of the suction pump (not shown) to the suction chamber 76. This causes some of the glycerol to pass through the nylon mesh and wire gauze and leave aligned fibres on the nylon mesh. As the mat of aligned fibres builds up it will tend to alter the flow pattern of the dispersion and hence only thin mats may be made on the apparatus described. If thicker mats are required it is necessary to arrange for the permeable surface to be gradually withdrawn so that the surface of the mat remains flush with the vertical surface.

We claim:
1. A process for the production of a mat of aligned fibres, suitable for impregnating with a matrix to form a composite material, comprising (1) passing a continuous stream of a dispersion of fibres in a liquid medium from a dispersion supply source to and over the whole of a permeable surface, subjecting the stream of dispersion to continuous acceleration relative to the permeable surface as it progresses across the permeable surface, thereby generating a continuous stable aligning force to produce and maintain a uniform pattern of alignment of the fibres in the dispersion, and simultaneously (2) applying a pressure difference across the permeable surface to cause part of the liquid medium to pass through the permeable surface and leave a mat of aligned fibres on the said surface, the rate at which liquid medium is withdrawn through the surface at any point being maintainend well below the rate of flow of the dispersion across the surface at that point to maintain an accelerating layer of disposition above the surface and minimize end-on deposition of fibers.

2. A process according to claim 1 wherein the rate of removal of liquid through the permeable surface is between 5 and 30% of the rate of supply of dispersion to the permeable surface.

3. A process according to claim 2 wherein the said rate of removal of liquid is between 10 and 15% of the rate of supply of dispersion.

4. A process according to claim 1 wherein the said continuous aligning force is produced by positive acceleration of the dispersion of fibres as it progresses across the permeable surface.

5. A process according to claim 4 wherein the said acceleration is produced by passing the dispersion between the permeable surface and one or more non-parallel surfaces arranged so that the flow area decreases progressively in the direction of flow.

6. A process according to claim 4 wherein the said acceleration is produced by gravity.

7. A process according to claim 1 wherein the liquid medium is water soluble.

8. A process according to claim 7 wherein the liquid medium is selected from the group consisting of glycerol, aqueous solutions of glycerol and aqueous solutions of cellulose ethers.

9. A process according to claim 1 wherein the permeable surface is a rigid filter surface selected from the group consisting of sintered glass plates, sintered metal plates, porous polyethlene sheet and metal gauze.

10. A process according to claim 1 wherein the permeable surface is a flexible porous gauze supported by a rigid wire mesh.

11. A process according to claim 1 wherein the fibres are selected from the group consisting of chopped carbon fibres, chopped nylon fibres, asbestos fibres, glass fibres, silicon nitride whiskers and silicon carbide whiskers.

12. A process according to claim 1 and in which the aligned fibre mat is subsequently impregnated with a solution of a thermo-setting resin in a suitable solvent, dried to remove the solvent and heated to partially cure the resin.

\* \* \* \* \*